(12) United States Patent
Kim (10) Patent No.: US 11,403,452 B2
(45) Date of Patent: Aug. 2, 2022

(54) LOGIC YIELD LEARNING VEHICLE WITH PHASED DESIGN WINDOWS

(71) Applicant: Synopsys, Inc., Mountain View, CA (US)

(72) Inventor: Kee Sup Kim, El Dorado Hills, CA (US)

(73) Assignee: Synopsys, Inc., Mountain View, CA (US)

(*) Notice: Subject to any disclaimer, the term of this patent is extended or adjusted under 35 U.S.C. 154(b) by 269 days.

(21) Appl. No.: 15/298,123

(22) Filed: Oct. 19, 2016

(65) Prior Publication Data

US 2017/0109470 A1 Apr. 20, 2017

Related U.S. Application Data

(60) Provisional application No. 62/244,114, filed on Oct. 20, 2015.

(51) Int. Cl.
*G06F 30/398* (2020.01)
*G06F 30/394* (2020.01)
*G06F 119/18* (2020.01)

(52) U.S. Cl.
CPC .......... *G06F 30/398* (2020.01); *G06F 30/394* (2020.01); *G06F 2119/18* (2020.01); *Y02P 90/02* (2015.11)

(58) Field of Classification Search
CPC ............. G06F 17/5068; G06F 17/5081; G06F 2217/12; G06F 30/394; G06F 30/398; G06F 2119/18; Y02P 90/02
See application file for complete search history.

(56) References Cited

U.S. PATENT DOCUMENTS

| 5,528,600 A * | 6/1996 | El Ayat .......... G01R 31/318516 324/750.3 |
| 2008/0148197 A1* | 6/2008 | Bickford ............. G06F 17/5045 438/14 |
| 2009/0144594 A1* | 6/2009 | Chakraborty .. G01R 31/318533 714/732 |

OTHER PUBLICATIONS

Blanton, R.D., et al., "Logic Characterization Vehicle Design for Maximal Information Extraction for Yield Learning," IEEE Test Conference, Paper 24.3, Oct. 2014, 10 pp.

* cited by examiner

*Primary Examiner* — Jack Chiang
*Assistant Examiner* — Aric Lin
(74) *Attorney, Agent, or Firm* — Weaver Austin Villeneuve & Sampson LLP (57) ABSTRACT

Techniques for providing improved semiconductor yield learning are discussed herein. Some embodiments may include a yield learning vehicle (YLV), including a communication fabric and a plurality of circuit blocks connected with the communication fabric. The plurality of circuit blocks may include circuit blocks having different design window sizes, and may be configured to support different phases of a yield learning ramp up process. The YLV may further include a yield learning controller configured to control circuit block testing, and bypasses configured to partially or fully replicate the behavior of improperly functioning or untested circuit blocks. Some embodiments may include techniques for software implementation of the YLV, such as by invoking a computer to receive data representative of a design of the YLV, and based on the data representative of the design of the integrated circuit, causing the computer to generate data representative of YLV.

21 Claims, 5 Drawing Sheets

LOGIC YIELD LEARNING VEHICLE WITH PHASED DESIGN WINDOWS

CROSS-REFERENCES TO RELATED APPLICATIONS

The present application claims benefit under 35 USC 119(e) of U.S. provisional application No. 62/244,114, filed Oct. 20, 2015, entitled "LOGIC YIELD LEARNING VEHICLE WITH PHASED DESIGN WINDOWS", the content of which is incorporated herein by reference in its entirety.

FIELD OF THE INVENTION

The present invention relates, generally, to techniques for integrated circuit (IC) testing and yield optimizing.

BACKGROUND OF THE INVENTION

In the production of ICs, certain yield limiters only become apparent with production chips or product-like test chips. Therefore, IC manufacturers use product-like test chips, or yield learning vehicles (YLVs), that have functional characteristics similar to production chips to provide testing and feedback for IC design and fabrication. The speed of a yield ramp up or yield learning is affected by the quality of the testing process and characteristics of the YLVs. In this regard, areas for improving current techniques have been identified.

BRIEF SUMMARY OF THE INVENTION

Embodiments of the present invention are directed to improving yield learning vehicles and methods. In particular, yield learning vehicles including blocks with varying and phased design window sizes are described herein.

These characteristics as well as additional features, functions, and details of various embodiments are described below.

BRIEF DESCRIPTION OF THE DRAWINGS

Having thus described some embodiments in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
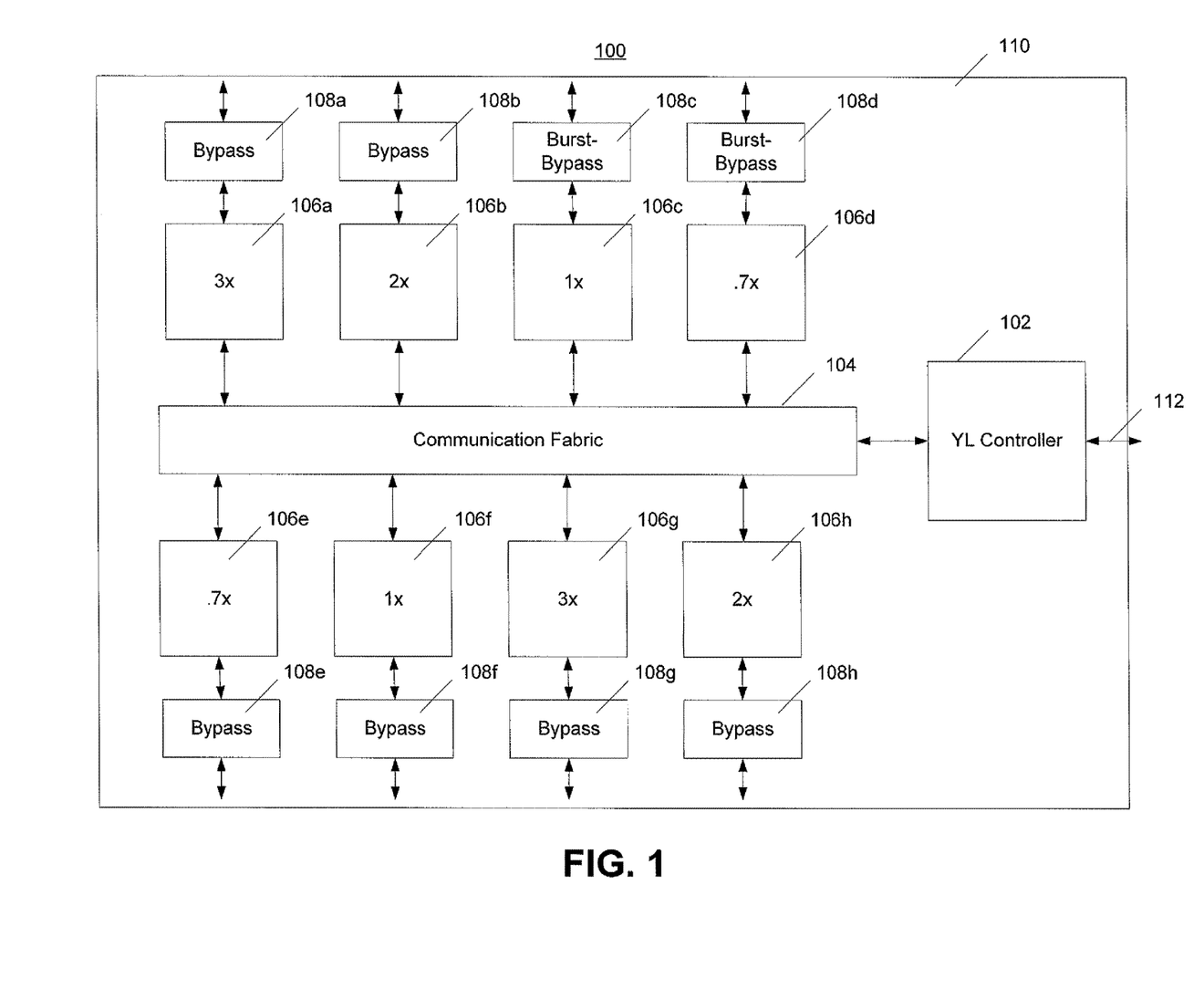
FIGS. 1 and 2 are examples of a yield learning vehicle with phased design windows, in accordance with some embodiments.
Figure 2:
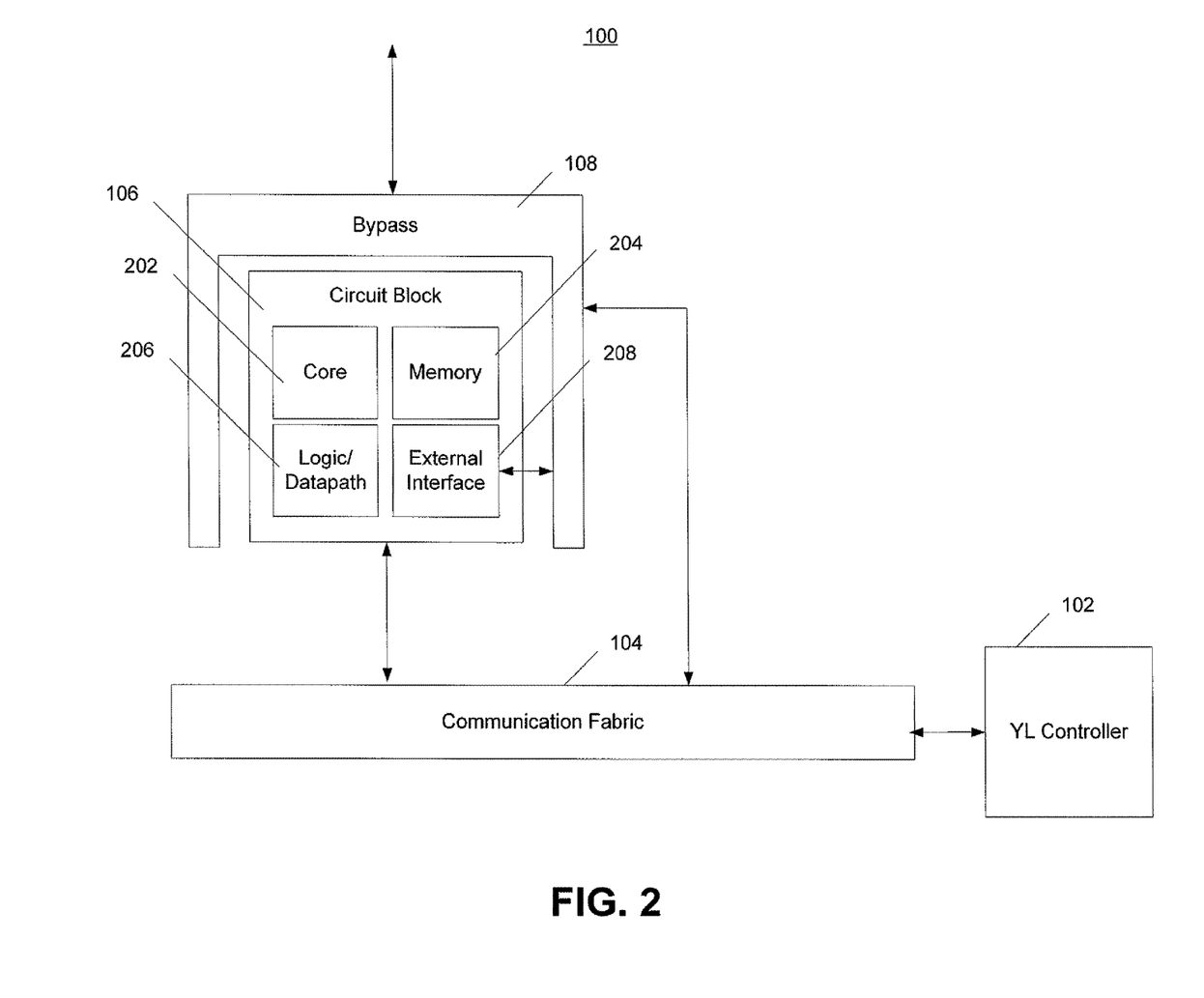

FIGS. 1 and 2 are block diagrams of an exemplary yield learning vehicle (YLV) 100, in accordance with some embodiments. The YLV 100 is an example of a "product-like" test chip that includes characteristics (e.g., functional and/or structural) that are similar to production chips, but further adapted to facilitate chip testing, such as for design and fabrication feedback.

Figure 3:
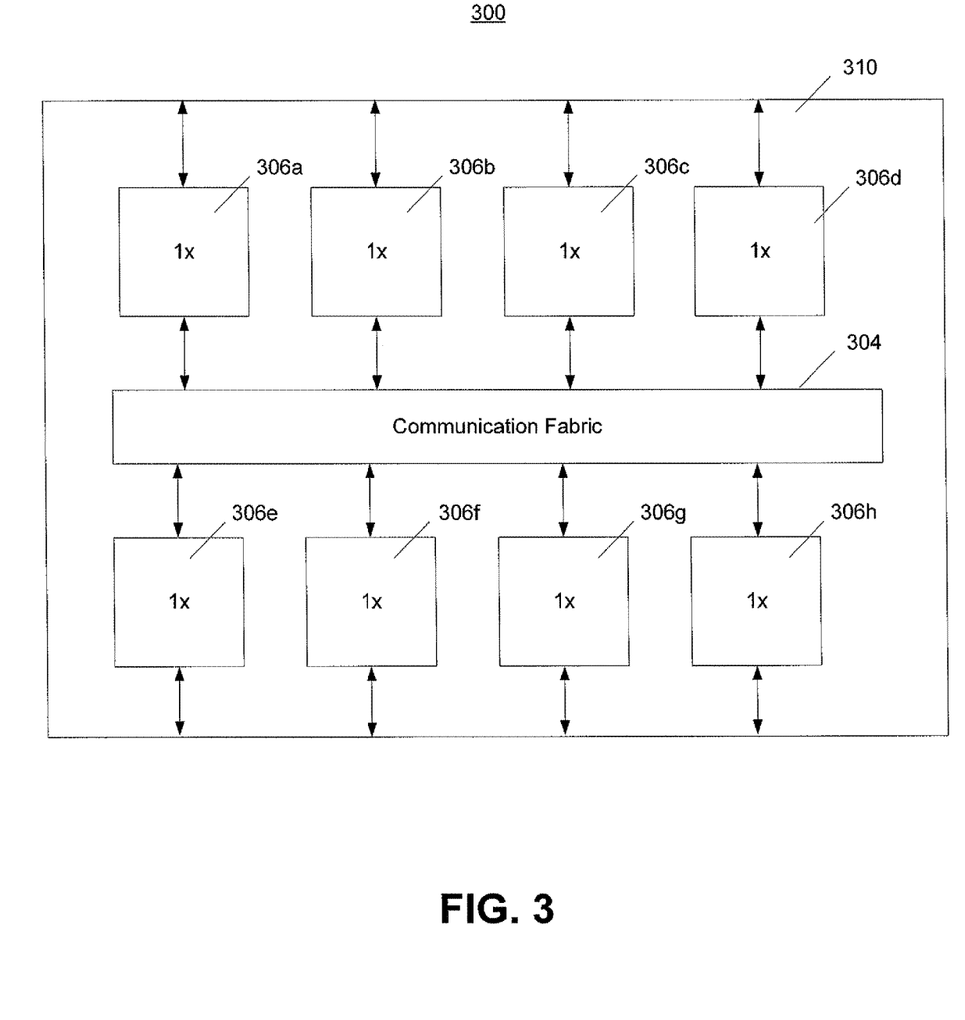
FIG. 3 is an example of a production chip, in accordance with some embodiments.

FIG. 3 is a block diagram of an exemplary production chip 300, in accordance with some embodiments. The production chip 300 is shown as including circuit blocks (which in some embodiments, may include semiconductor intellectual property (IP) blocks) 306a-h that are connected via a communication fabric 304. The circuit blocks 306a-h and communication fabric 304 may be fabricated on the same substrate 308. In some embodiments, one or more (e.g., all, as shown) of the circuit blocks 306a-h may further include external interfaces that connect to the outside of the production chip 300.

With reference to FIG. 1, YLV 100 may be implemented as a product-like test chip for the production chip 300 (see FIG. 3), and thus may include circuit blocks 106a-h that are connected to one another via a communication fabric 104. Each of the circuit blocks 106a-h of the YLV 100 may respectively correspond to one of the circuit blocks 306a-h of the production chip 300. As described in greater detail below, however, circuit blocks 106a-h of the YLV 100 may include different (e.g., "phased") design window sizes (e.g., 3×, 2×, 0.7×, etc.) compared to the standard (e.g., 1×) design window size of the production circuit blocks 306a-h. Advantageously, the YLC with phased design windows are implemented to provide increased testing observability and debug features for partially functional blocks than would be otherwise possible using conventional product-like test chips.

To facilitate testing, the YLC 100 may further include yield learning controller 102 and bypasses 108a-h, each of which may be fabricated onto a substrate 110 with the circuit blocks 106 and communication fabric 104. The yield learning controller 102 may be configured to manage and control the testing of the circuit blocks 106a-h of the YLV 100. Various features of the circuit blocks 106 may be tested, such as circuit block functionality, structure, and/or inter-communication. The yield learning controller 102 may be configured to generate or otherwise provide input signals (e.g., a stream of control and data signals) to a circuit block 106 and receive output signals (e.g., a stream of output signals) from the circuit block 106, such via the communication fabric 104.

In some embodiments, the yield learning controller 102 may be configured to provide an interface 112 between the communication fabric 104 and an external tester (e.g., automated testing equipment) or bench setup (e.g., mock up device). For example, the yield learning controller 102 may be configured to format input test data from an external tester into packets or other format suitable for transmission through the communication fabric 104. Similarly, the yield learning controller 102 may be configured to format output test data from a circuit block received from the communication fabric into a format suitable for the external tester.

In some embodiments, some or all of the functionality of the yield learning controller 102 may be provided by an external tester. Here, the YLV 100 may be fabricated without the yield learning controller 102, and may alternatively include an external fabric interface configured to connect the external tester to the communication fabric 104.

Each circuit block 106a-h may include a functional block of semiconductor components. With reference to FIG. 2, showing a more detailed view of the yield leaning vehicle (YLV) 100, a circuit block 106 may include one or more of cores 202, memories 204, logic/datapaths 206, and an external interface 208 (e.g., depending on the function of the particular circuit block). The core 202 may include one or more central processing units (CPUs), signal processors, logic blocks, and/or special purpose cores. Memory 204 may be configured to store files or data. The logic/datapath 206 may include random control logic (e.g., gates, flip flops, adders, muxes) and/or datapaths for complex arithmetic functions. The external interface 208 may be configured to receive inputs and provide outputs external to the circuit block 106. Where a circuit block 106 includes cores, memories, logic/datapaths, etc. the circuit block 106 may represent a System on Chip (SoC). In some embodiments, the production chip 300 may be a SoC, and the circuit blocks 106 may represent system components such as cores, memories, logic/datapaths, etc.

The communication fabric 104 may include an on-chip fabric configured to provide communication channels that connect the blocks 106a-h with the yield learning controller 102. In various embodiments, the communication fabric 102 may include network-on-chip communication channels, busses, and/or other connection circuitry. In some embodiments, the external interface 204 the circuit block 106 may be connected with the communication fabric 104 as shown in FIG. 2.

The YLV 100 may further include a bypass associated with each of the circuit blocks 106a-h, such as bypasses 108a-h as shown in FIG. 1. A bypass 108 may be a wrapper or interface between the communication fabric 104 and the circuit block 106, and may be configured to facilitate testing of the circuit block 106 by providing external test inputs to the circuit block via the external interface 208. In some embodiments, the bypass 108 may also be a wrapper or interface between an external connection and the circuit block 106. The test inputs may include static or varying data (e.g., repeating patterns of data), stored in the bypass 108 and/or provided to the bypass from the yield learning controller 102. The circuit blocks 106 may be configured to receive the external test inputs from the bypass 108 and generate output test data.

Additionally or alternatively, when a circuit block 106 is not the subject of a test, producing an incorrect output or otherwise malfunctioning, the bypass 108 may be configured to provide the output test data of the circuit block 106. For example, the output test data may be sent from the bypass 108, to the circuit block 106 via the external interface 208, and then to the communication fabric 104. Here, other circuit blocks may continue to function or be tested even when the circuit block 106 has partially or fully malfunctioned (e.g., replicating an output of circuit block 106b to test interoperability with circuit block 106a).

With reference to FIG. 2, the bypass 108 may be connected to the external interface 208 of the circuit block 106. The bypass 108 may be further connected with the yield learning controller 102, such as via the communication fabric 104. The bypass 108 may be further connected with an external connection to the YLV, which may be used to provide bypass signals to the communication fabric or to the circuit block 106. Each of the bypasses 108a-h of the YLV 100 may be connected as shown in FIG. 2 for the bypass 108.

In some embodiments, one or more bypasses 108 may be connected with the yield learning controller 102 separately from the communication fabric 104 connecting the circuit blocks 106, such as using a separate communication fabric, bus, or other connection circuitry. The separate connections, when used, may also be fabricated on the substrate 110 or otherwise be an on-chip fabric.

In some embodiments, the YLV 100 may include one or more burst-bypasses, such as burst-bypass 108c associated with the circuit block 106c, and burst-bypass 108d associated with the circuit block 106d. A burst-bypass may be used for circuit blocks 106 that are configured to communicate externally using a burst mode, such as those utilizing Peripheral Component Interconnect (PCI) express or USB protocols.

Although the YLV 100 is shown in FIG. 1 as including eight circuit blocks 106a-h, the YLV 100 may include any number of circuit blocks. When the YLV 100 includes multiple circuit blocks 106, the circuit blocks 106 may include different "design window size." As used herein, a "design window size" of a circuit block refers to a measure of block parameter variances that the circuit block is designed to support or tolerate. For example, such block parameters may include (e.g., N & P) transistor speed, metal sheet resistance, cross coupling capacitance, etc. Circuit blocks with a larger design window size are more conservatively designed, and thus will support a larger range of block parameter variance. For example, a circuit block with a larger design window size may be configured to function at lower transistor speeds than the standard, production transistor speed of the production chip 300. In contrast, circuit blocks with smaller design window sizes are more aggressively designed, and thus will support a narrower range of parameter variance.

Different design window sizes may be associated with different test "phases" of a production yield ramp up. As discussed in greater detail below with respect to method 100 shown in FIG. 4, a test process may include fabricating the YLV 100, testing the circuit blocks with the largest design window sizes, and adjusting the process (and if needed design) accordingly (e.g., fabricating a new, adjusted YLV 100). When the circuit blocks with the largest design window sizes have tested successfully, the next "phase" can begin with the next largest circuit blocks may be tested, and so forth. Advantageously, because of mask design and fabrication time and cost, it is more efficient to use the same YLV designs as process matures. (e.g., for the different phases).

With reference to FIG. 1, the design window sizes of the circuit blocks 106a-h are defined with respect to standard block parameters that represent the 1× design window size. In some embodiments, the standard block parameters and 1× design window size are defined with respect to an expected yield. For example, the standard block parameters and 1× design window size may be set so that fabricated blocks yield at (or are expected to yield at) 99.96%. As discussed above, the production chip 300 may include 1× design window size, and thus 99.96% of fabricated production chips 300 will be expected to yield. In various embodiments, the standard block parameters that represent the 1× design window size may be set based on the desired expected yield.

The circuit blocks 106 of the YLV 100 may include different design window sizes, such as a 3× design window size for the circuit blocks 106a and 106g, a 2× design window size for the circuit blocks 106b and 106h, a 1× design window size for the circuit blocks 106c and 106f, and a 0.7× design window size for the circuit blocks 106d and 106e. The 0.7× design window size represents a design window size that is even more aggressively designed than the standard 1× design window size.

The design window size values for the circuit blocks 106 of an YLV 100 may be configured as appropriate to provide testing throughout the life of a yield ramp up to monitor/detect yield issues. For example, the design window sizes of the circuit blocks 106 may be graded to yield test data throughout each test phase (e.g., 3×, 2×, 1×, and 0.7×). However, the design window sizes are not necessarily defined with respect to a multiple of the standard design window size, and are also not necessarily limited to the 3×, 2×, 1×, or 0.7× values shown.

In some embodiments, the yield learning controller 102 may also include a large design window size to improve the reliability of core testing functionality. For example, the yield learning controller 102 may include the largest 3× design window size like the circuit blocks 106a and 106g. In another example, the yield learning controller 102 may include the largest design window size relative to the circuit blocks 106 (e.g., 4× when the largest circuit block is 3×).

In some embodiments, circuit blocks 106 may be associated with different window sizes based on their production functionality. For example, circuit blocks 106 associated with more central or fundamental operations (e.g., an operating system) may be designed with a larger design window than circuit blocks 106 associated with more peripheral operations (e.g., a camera, microphone, etc.). In some embodiments, the communication fabric 104, bus, or other connecting circuitry may also be designed with a larger (e.g., the largest) design window.

Figure 4:
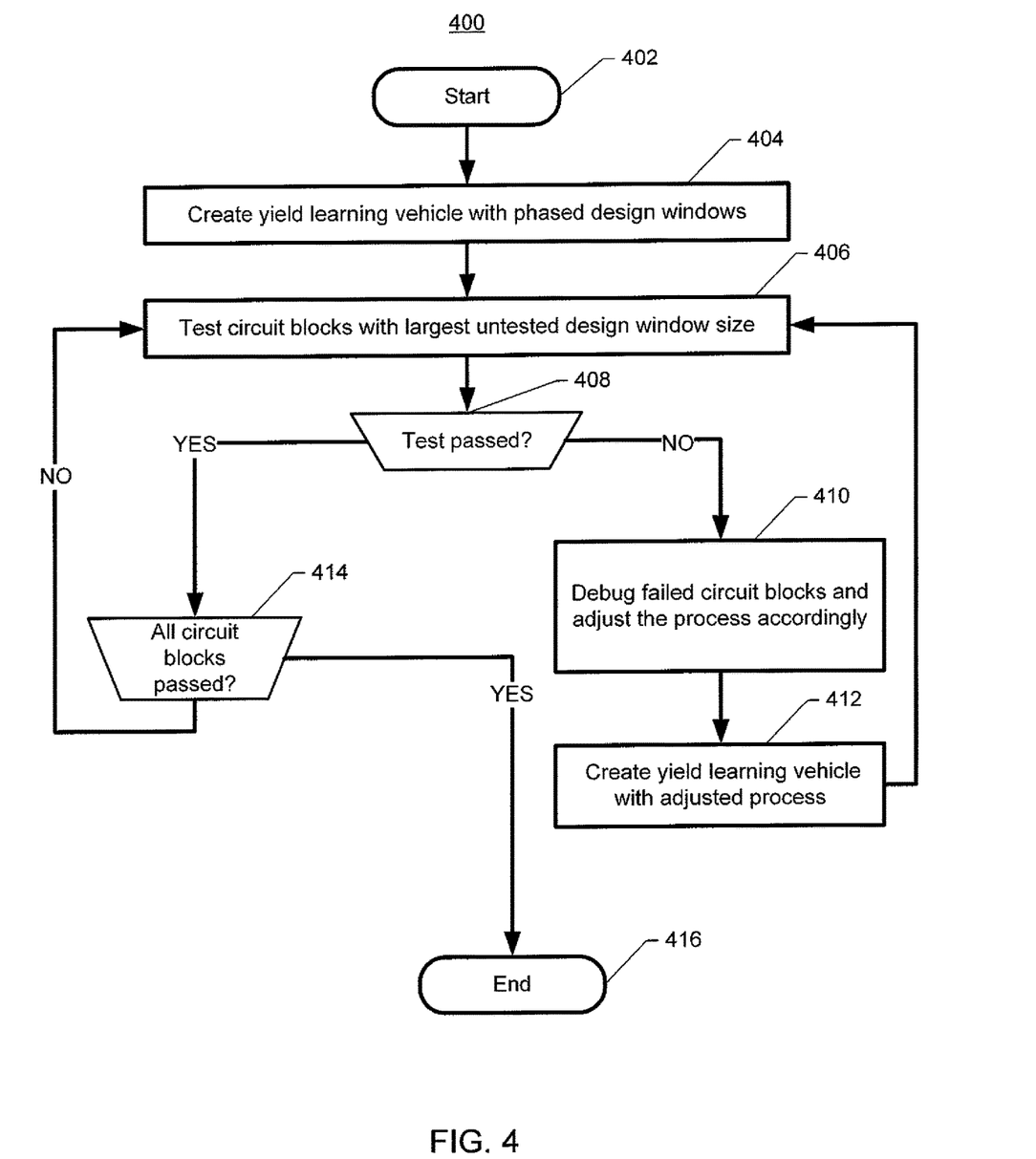
FIG. 4 is a flowchart for improving yield learning vehicle, in accordance with some embodiments.

As discussed above, "design window size" refers to a measure of designed tolerance for block parameter variance, and some block parameters may include process or transistor speed, metal sheet resistance, cross coupling capacitance. Process speed within in circuit block 106 refers to the speed of the transistors or other components, which may be affected by factors such as physical size or other structural characteristics such as doping level or body biasing voltage of the components (e.g., skewed fast-slow or slow-fast for the NMOS and PMOS corners of a transistor). To account for slow process, larger transistors can be used to compensate for the speed. For fast process speed, more buffers can be used to preserve setup time. Metal sheet resistance refers to the resistance of metallic film structures, which can cause unwanted energy dissipation, heat generation, and slower processing speeds when too high. Thus a larger design window may be set to accommodate higher metal sheet resistances, such as by widening metal interconnects. Cross coupling capacitive refers to the unintended capacitance between conductive structures, which also results in slower processing speeds. Thus a larger design window may be set to accommodate higher cross coupling capacitance, such as by spacing conductive structures further apart or by including isolating material or by using larger transistors to drive cross coupled signals FIG. 4 shows a flowchart of an example of a method 400 of yield learning with a yield learning vehicle, performed in accordance with some embodiments. Method 400 may be performed with yield learning vehicles, such as YLV 100, to monitor and correct yield issues throughout the life of a yield ramp up process.

Method 400 may begin at 402 and proceed to 404, where a yield learning vehicle (YLV) with phased design windows may be created. The YLV may be the YLV 100 as discussed above, and thus may include multiple circuit blocks including different "phased" design window sizes (e.g., 3×, 2×, 1×, etc.). The YLV may further include a communication fabric, yield logic controller, and bypasses. In some embodiments, the components of the YLV may be fabricated together on a common substrate and/or via shared processes. Creating the TLV may include designing the components, layout, functionality, etc. of the YLV, and then creating the YLV via a semiconductor fabrication process.

At 406, one or more (e.g., all) circuit blocks including the largest untested design window size may be tested. The testing of the YLV may be performed when the YLV (e.g., the yield learning controller 102) is connected to a tester or bench setup, and the YLV is powered on and/or reset. The tester may be a computing device that is manually operated, and/or may be programmatically controlled to perform predefined testing routines. In some embodiments, the yield learning controller 102 may be configured to place the circuit blocks in a yield learning mode to perform the testing.

With reference to FIG. 1, for example, the circuit blocks 106a and 106g including the largest 3× design window size may be tested first, representing the first phase of testing for the most conservatively designed circuit blocks. Various types of yield tests may be performed, such as performance, structural, and/or interoperability tests.

The yield learning controller 102 may be configured to control the testing of the circuit blocks within the YLV, such as by stimulating and observing circuit block behavior. For example, to test the circuit block 106a, the yield learning controller 102 may be configured to provide input signals to the circuit block 106a, and/or input test data to the associated bypass 108a (e.g., via the communication fabric 104). The circuit block 106a, if functioning as intended or expected, will receive the input signals and/or input test data and generate output signals or output test data The output signals may then be transmitted through the communication fabric, to the yield learning controller 102, and then to the tester externally when appropriate.

The yield learning controller 102 can thus activate circuit blocks individually for testing and provide streams of control signals and observe streams of output signals via the communication fabric 104. In some embodiments, circuit blocks 106 may be further configured to provide a signature with the output test data or output signals to the yield learning controller 102 via the communication fabric 104.

In some embodiments, to test one particular circuit block, or interoperability between circuit blocks, one or more other circuit blocks of interest may be placed in a bypass mode. For example, to test the circuit block 106a interoperability with circuit block 106g, the yield learning controller 102 may be configured to place circuit block 106g in the bypass mode and send the expected output test data to the associated bypass 106g. In that sense, each circuit block 106 may provide for "self-sufficient" testing that does not rely on the proper functioning of any other circuit block or external stimuli. Depending on tester or bench setup, external connection to the circuit blocks can optionally be bypassed.

In some embodiments, the yield learning controller 102 may be configured to test interoperability for each of the circuit blocks having the same phase design window size. A circuit block determined to be malfunctioning may be placed in the bypass mode to test other circuit blocks until each circuit block of the same design window size has been tested.

In some embodiments, the circuit blocks with smaller design window sizes than the circuit block being tested may be put in a bypass mode to test circuit blocks having larger design window sizes. As such, the YLV can be used for earlier phases of yield ramp up even when important circuit blocks with smaller design windows are untested, or partially/fully nonfunctional. For example, the yield learning controller 102 may be configured to place circuit blocks 106b in the bypass mode by sending the expected output test data to each of the associated bypass 108b. In some embodiments, to test a single circuit block, each of the other circuit blocks may be placed in the bypass mode.

At 408, the yield learning controller 102 (or external tester) may be configured to determine whether the circuit block passed testing. For example, the yield learning controller 102 may receive the output test data from the circuit block 106 being tested, and may compare the output test data to expected test data.

In response to determining that the circuit block being tested failed to pass testing, method 400 may proceed to 410, where failed circuit blocks may be debugged and the process adjusted accordingly. For example, the fabrication process and/or design of the circuit blocks with the largest untested design window size may be adjusted based on the test results. In some embodiments, the yield learning controller 102 may be configured to operate in a yield learning debug mode for diagnoses of the circuit block. The feedback may then be used to adjust the circuit block fabrication process and/or design.

At 412, yield learning vehicles with the adjusted process and/or design can be created. For example, a new yield learning vehicle including adjusted circuit blocks may be created. The new YLV may include the same phased design windows for each of the circuit blocks. The discussion at 404 may be applicable at 410. In some embodiments, the successfully tested higher phase blocks may be redesigned using a smaller (e.g., the next phase) design window size.

Method 400 may then return to 406, where the circuit blocks with the adjusted circuit blocks, representing the (e.g., remaining) largest untested design window size, may be tested. For example, the process may be repeated for the 2× test phase until each of the circuit blocks 108b and 108h including the 2× design window size has been successfully tested.

Returning to 408, in response to determining that the circuit blocks associated with the largest untested design window size has passed testing, method 400 may proceed to 414, where a determination may be made as to whether all of the circuit blocks have passed their associated tests. For example, after the circuit blocks 106d and 106e having the smallest 0.7 design window size has successfully tested, then no other circuit blocks remain untested and the YLV has passed each test phase. Method 400 may then proceed to 416 and end.

In response to determining that not all circuit blocks have passed testing, method 400 may return to 406, where circuit blocks including the (e.g., next) largest untested design window size may be tested. For example, subsequent to testing the 3× design window size circuit blocks 108a and 108g, the circuit blocks 106b and 106h associated with the next largest 2× design window size may be tested, and so forth. When each circuit block has passed testing, method 400 may end at 416.

Advantageously the YLV 100 is capable of reliably (e.g., always) providing useful yield information because some portion of the YLV can be expected to be operational. For example, the use of large design window sizes (e.g., circuit blocks, yield learning controller, etc.) results in those components being more likely to be operational. Similarly, the use of bypasses can ensure that even fully or partially malfunctioning circuit blocks (e.g., more aggressively designed blocks) will not adversely affect the functioning and testing of the other circuit blocks. Thus the use of several different design window sizes provides for a graded (e.g., progressively tightening) design closure for the circuit blocks throughout the maturing production process. Furthermore, observability of circuit blocks is increased with enhanced debug hooks and enhanced debug features for partially functional blocks (e.g., to provide meaningful test data). Advantageously, yield ramp up time and efficiency (e.g., savings on fabrication equipment investment) is improved.

Figure 5:
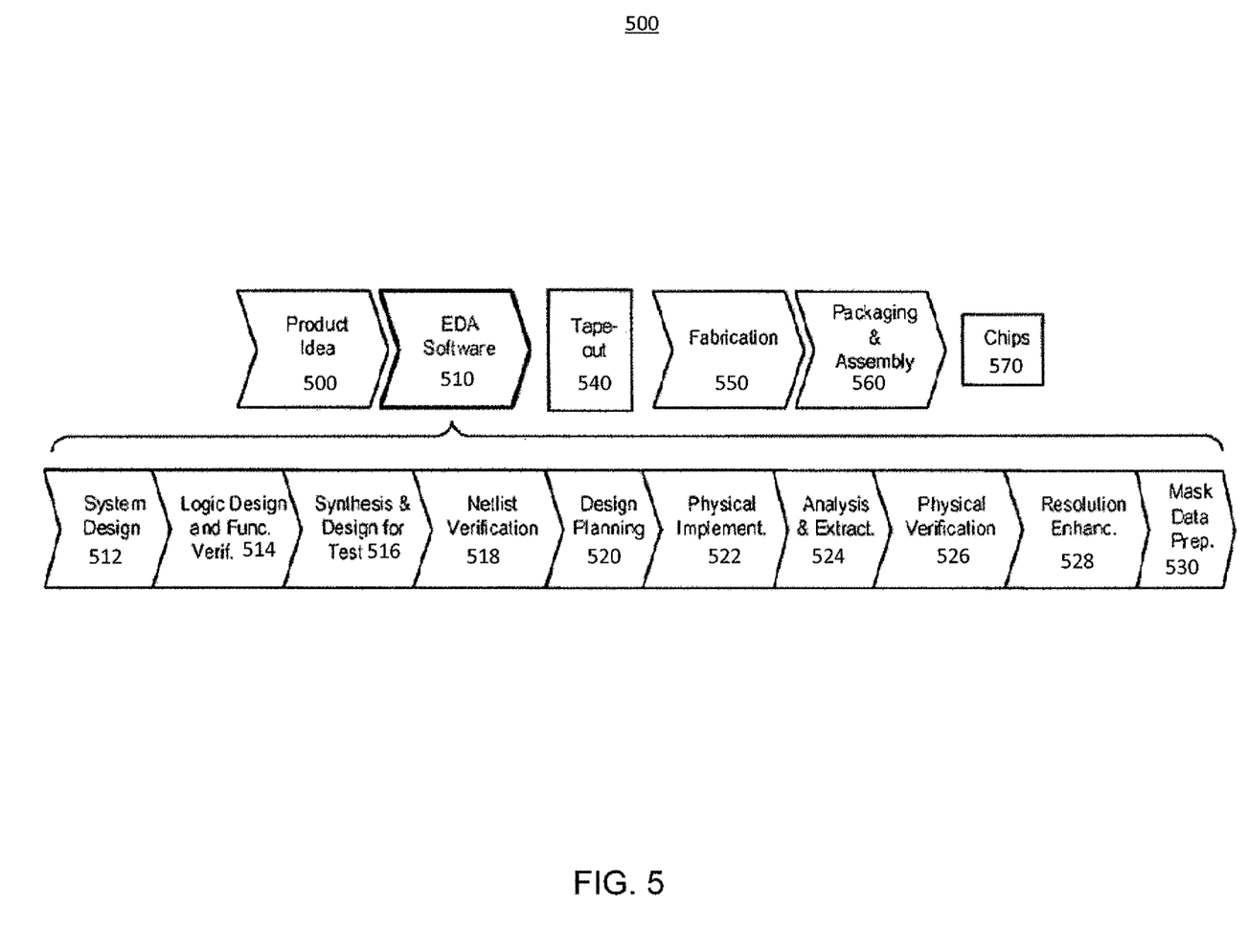
FIG. 5 depicts simplified exemplary steps in the design and fabrication of a yield learning vehicle, in accordance with some embodiments.

In some embodiments, the YLV 100 may be designed or otherwise implemented using Electronic Design Automation (EDA) software. FIG. 5 depicts simplified exemplary steps in the design and fabrication of a yield learning vehicle. The process starts with a product idea 500, which is realized using EDA software 510. Chips 570 (e.g., VLC 100 or production chip 300) can be produced from the finalized design by performing fabrication 550 and packaging and assembly 560 steps. An exemplary design flow that uses EDA software 510 is described below for illustration purposes only. For example, an actual integrated circuit design may require a designer to perform the design flow steps in a different sequence than the sequence described below.

In the system design 512, a designer describes the functionality to be implemented. The designer can also perform what-if planning to refine the functionality and to check costs. Further, hardware-software architecture partitioning can occur at this step. In the design and functional verification 514, a Hardware Description Language (HDL) design may be created and checked for functional accuracy.

In the synthesis and design 516, the HDL code can be translated to a netlist, which can be optimized for the target technology. Further, tests can be designed and implemented to check the finished chips. In the netlist verification 518, the netlist can be checked for compliance with timing constraints and for correspondence with the HDL code. In the design planning 520, an overall floor plan for the chip can be constructed and analyzed for timing and top-level routing. Next, in the physical implementation 522, placement and routing can be performed.

In the analysis and extraction 524, the circuit functionality can be verified at a transistor level. In the physical verification 526, the design can be checked to correct any functional, manufacturing, electrical, or lithographic issues. In the resolution enhancement 528, geometric manipulations can be performed on the layout to improve manufacturability of the design. Finally, in the mask data preparation 530, the design can be taped-out 540 for production of masks to produce finished chips.

In that sense, the YLC 100 may be implemented with the use of EDA software 510 executing on a computing device. For example, some embodiments may provide for a computer-implemented method for improving a yield of an integrated circuit. The method may include invoking a computer to receive data (e.g., HDL code) representative of a design of the integrated circuit (e.g., the YLC 100), and causing the computer to generate data (e.g., a netlist) representative of the YLC 100 as described herein. For example, the integrated circuit may include a communication fabric, and a plurality of circuit blocks coupled with the communication fabric. The plurality of circuit blocks may include: a first circuit block including a first design window size; and a second circuit block including a second design window size different from the first design window size. The integrated circuit may also include bypasses and/or a yield logic controller as discussed herein. The on-chip components, and their arrangements, may be described by the data representative of the design of the integrated circuit.

Some embodiments may provide for a system for improving yield of an integrated circuit. The system may be configured to receive data representative of a design of the integrated circuit; and generate data representative of the YLC 100 as described herein. For example, the integrated circuit may include a communication fabric, and a plurality of circuit blocks coupled with the communication fabric. The plurality of circuit blocks may include: a first circuit block including a first design window size; and a second circuit block including a second design window size different from the first design window size. The integrated circuit may also include bypasses and/or a yield logic controller as discussed herein.

In some embodiments, some or all of testing described above (e.g., in connection with method 400 and FIG. 4) using a physical YLC 100 may be implemented via software test simulation. For example, a system or computer may be configured to generate the data representative of the YLC 100, and may be further configured to perform performance, structural, and/or interoperability testing on the generated data.

The above embodiments of the present invention are illustrative and not limitative. Other additions, subtractions or modifications are obvious in view of the present invention and are intended to fall within the scope of the appended claims.

What is claimed is:

1. A circuit comprising:
a communication fabric;
a first circuit block defined by a first design window size;
a second circuit block defined by a second design window size different from the first design window size;
a yield logic controller connected with the first circuit block and the second circuit block via the communication fabric, wherein the yield logic controller is configured to control testing of the first circuit block and the second circuit block, wherein the yield logic controller is defined by the first design window size that is larger than the second design window size.

2. The circuit of claim 1, wherein each of the first circuit block and the second circuit block includes an external interface connected with a bypass.

3. The circuit of claim 2, wherein the bypass is configured to provide input test data to the external interface of the first circuit block, the first circuit block is configured to generate output test data based at least in part on the input test data, and the first circuit block is configured to provide the output test data to the communication fabric.

4. The circuit of claim 2, wherein the bypass is configured to provide output test data to the first circuit block, and the first circuit block is configured to provide the output test data to the communication fabric subsequent to receiving the output test data from the bypass.

5. The circuit of claim 2, wherein the bypass includes a burst-bypass and the external interface of the first circuit block is configured to operate in a burst mode.

6. The circuit of claim 1 further comprising:
a third circuit block defined by the first design window size,
a fourth circuit block defined by the second design window size; and
a fifth circuit block defined by a third design window size different from the first design window size and the second design window size.

7. The circuit of claim 1 wherein the first circuit block and the second circuit block perform identical functions.

8. The circuit of claim 1 wherein the first circuit block and the second circuit block are coupled to one another via a plurality of interconnects.

9. A circuit comprising:
a communication fabric;
a first circuit block defined by a first design window size;
a second circuit block defined by a second design window size different from the first design window size; and
a yield logic controller connected with the first circuit block and the second circuit block via the communication fabric, wherein the yield logic controller is configured to control testing of the first circuit block and the second circuit block, wherein the yield logic controller is defined by a third design window size that is larger than each of the first window size and the second design window size.

10. The circuit of claim 9 wherein each of the first circuit block and the second circuit block includes an external interface connected with a bypass.

11. The circuit of claim 9 further comprising:
a third circuit block defined by the first design window size;
a fourth circuit block defined by the second design window size; and
a fifth circuit block defined by a third design window size different from the first design window size and the second design window size.

12. The circuit of claim 9 wherein the first circuit block and the second circuit block perform identical functions.

13. The circuit of claim 9 wherein the first circuit block and the second circuit block are coupled to one another via a plurality of interconnects.

14. A method of testing an integrated circuit, the method comprising:
forming a communication fabric in the integrated circuit;
forming a first circuit block defined by a first design window size in the integrated circuit;
forming a second circuit block defined by a second design window size different from the first design window size in the integrated circuit; and
forming a yield logic controller connected with the first circuit block and the second circuit block via the communication fabric in the integrated circuit, wherein the yield logic controller is configured to control testing of the first circuit block and the second circuit block, wherein the yield logic controller is defined by the first design window size that is larger than the second design window size.

15. The method of claim 14 wherein each of the first circuit block and the second circuit block includes an external interface connected with a bypass.

16. The method of claim 15 wherein the bypass is configured to provide input test data to the external interface of the first circuit block, the first circuit block is configured to generate output test data based at least in part on the input test data, and the first circuit block is configured to provide the output test data to the communication fabric.

17. The method of claim 15, wherein the bypass is configured to provide output test data to the first circuit block, and the first circuit block is configured to provide the output test data to the communication fabric subsequent to receiving the output test data from the bypass.

18. The method of claim 15 wherein the bypass includes a burst-bypass and the external interface of the first circuit block is configured to operate in a burst mode.

19. The method of claim 14 further comprising:
forming a third circuit block defined by the first design window size in the integrated circuit,
forming a fourth circuit block defined by the second design window size; in the integrated circuit and
forming a fifth circuit block defined by a third design window size different from the first design window size and the second design window size in the integrated circuit.

20. The method of claim 14 wherein the first circuit block and the second circuit block perform identical functions.

21. The method of claim 14 further comprising:
coupling the first circuit block and the second circuit block to one another via a plurality of interconnects.

* * * * *